Aug. 10, 1943.  A. R. MABEY  2,326,238
CONTROLLING APPARATUS
Filed June 3, 1941  2 Sheets-Sheet 1

INVENTOR.
ARTHUR R. MABEY
BY
E.C. Sanborn
ATTORNEY

Aug. 10, 1943.    A. R. MABEY    2,326,238
CONTROLLING APPARATUS
Filed June 3, 1941    2 Sheets-Sheet 2
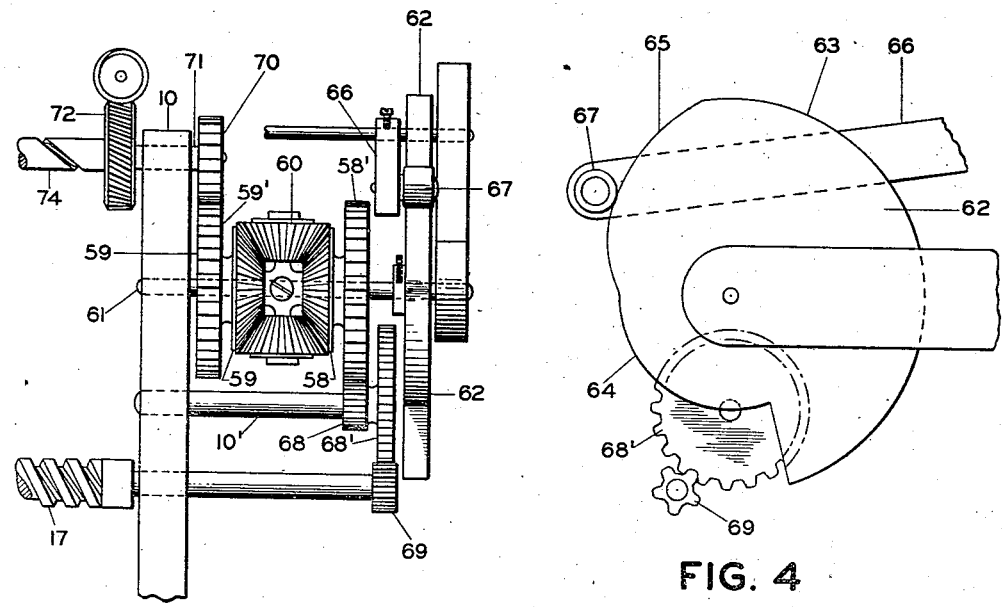
INVENTOR.
ARTHUR R. MABEY
BY E.C. Sanborn
ATTORNEY Patented Aug. 10, 1943

2,326,238

UNITED STATES PATENT OFFICE 2,326,238

CONTROLLING APPARATUS

Arthur R. Mabey, Waterbury, Conn., assignor to The Bristol Company, Waterbury, Conn., a corporation of Connecticut Application June 3, 1941, Serial No. 396,483

6 Claims. (Cl. 74—1)

This invention relates to automatic control devices, and more especially to an automatic control mechanism adapted for use with a measuring instrument of the self-balancing potentiometer class, wherein it is desired by pneumatic or other means to maintain at a predetermined value the magnitude of the condition whose measurement is effected by the instrument.

In U. S. Letters Patent No. 2,115,528, issued to O. H. Hunt, April 26, 1938, there is disclosed a method by which a pneumatic control device may be rendered subject to a measuring instrument of the potentiometer class; and this invention is directed essentially to improvements whereby the principles set forth in said patent may be more effectually utilized, and rendered more widely applicable to meet a variety of control conditions.

It is an object of this invention to provide a compact cam-actuated control system, readily applicable to the mechanism of a self-balancing potentiometer.

It is a further object to provide such a system in a form which shall be inherently free of backlash between the control and actuating mechanisms.

It is a further object to provide such a mechanism in a form adaptable to either pneumatic or electric control.

It is a further object to provide the mechanism of such a system in a form which shall be readily adjustable to any desired control point, and which shall show a consistent performance at all settings.

It is a further object to provide said mechanism in a unitary form, rendering all parts accessible for inspection and adjustment while the mechanism remains in normal operation.

Other features and advantages of the invention will be hereinafter described and claimed.

In the accompanying drawings:

Fig. 2 is a diagrammatic representation of a complete installation including the instrument.

Figs. 3 and 4 are a side- and end- elevation, respectively, of certain details of the mechanism.

Fig. 5 is a perspective representation of a portion of the instrument in a modified form.

Figure 1:
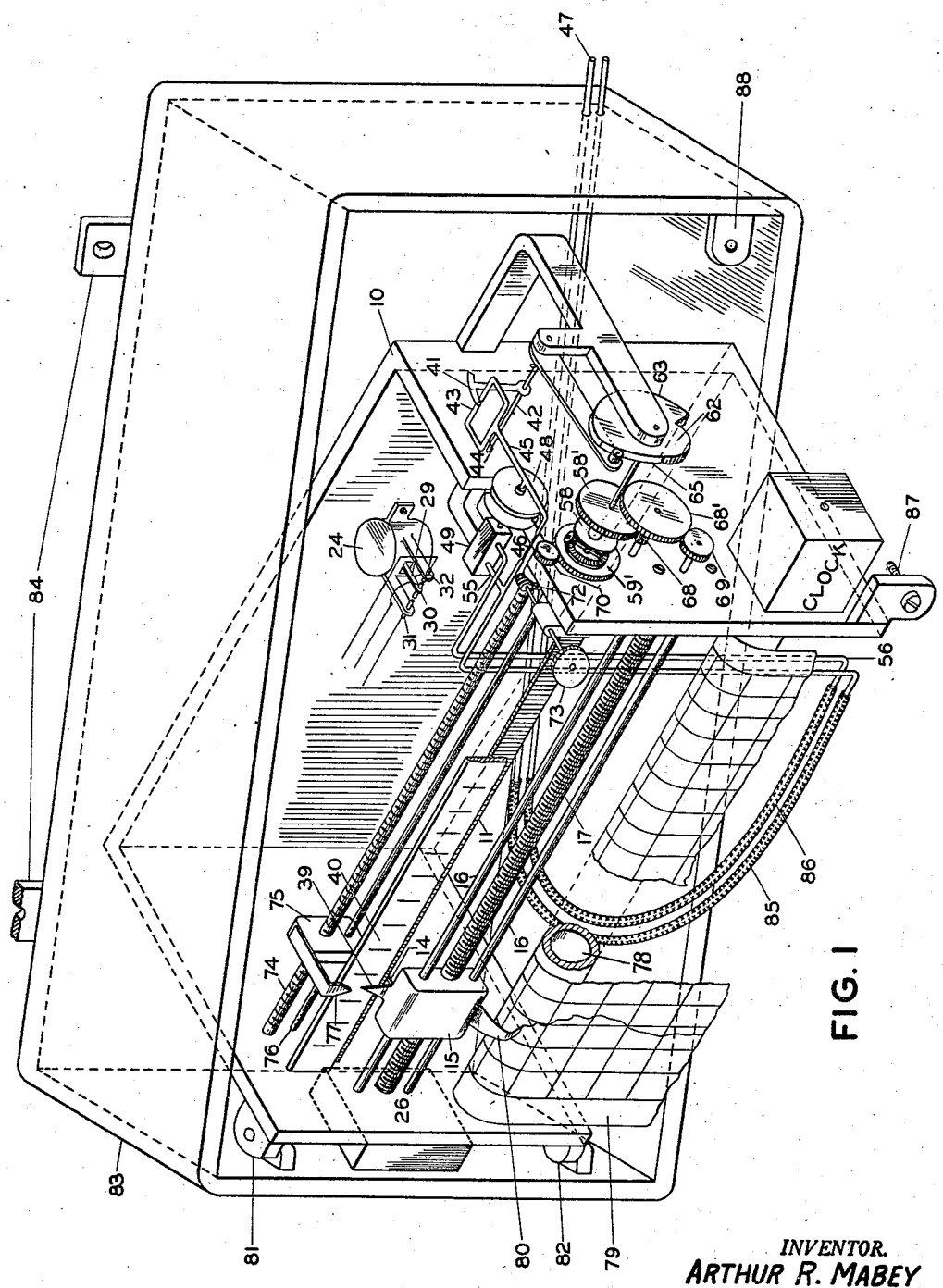
Fig. 1 is an isometric representation of an instrument embodying the principles of the invention.

Referring now to the drawings:

In Figs. 1 and 2, which represent an application of the principles of the invention to temperature control by pneumatic means, 10 designates a framework upon which are mounted a self-balancing potentiometer mechanism, a pneumatic control mechanism of the "free-vane" class, a differential gear train for operatively associating the two for control purposes, and a common scale for indicating the relation between the set value of the control system and the actual value of the controlled variable, together with a recording mechanism whereby may be obtained a permanent record of all values attained by said variable over a period of time.

Mounted in the framework 10 is an extended slide-wire structure 11, forming a part of a conventional potentiometer circuit, as shown in Fig. 2 wherein a battery 12 supplies a constant current through said slide-wire in series with rheostat 13 made adjustable for the purpose of standardizing the slide-wire current to a predetermined value. A contact 14 is adapted to translate along the slide-wire 11, and is borne by a carriage 15 free to travel on guide rails 16 attached to the framework 10, whereby said carriage and contact may be given motion parallel to the extended length of said slide-wire structure by means of a lead screw 17 threadedly engaging the carriage 15.

An oven or furnace 18 is adapted to be heated by the combustion of a fluid fuel admitted to a burner 19 through a pneumatic valve 20 of the conventional diaphragm-operated type. Positioned within the furnace 18 is a thermocouple 21 exposed to the internal temperature which it is desired to record and regulate. Connected to the thermocouple 21 are conductors 22 and 23 leading respectively to one end of the slide-wire 11 and to one terminal of a sensitive contact-making galvanometer 24, the other terminal of said galvanometer being connected by means of a conductor 25 to the contact 14.

A reversible electric motor 26 operatively attached to the lead screw 17 is adapted to be driven in either direction according to the alternative energization of its two windings 27 and 28, thereby translating the carriage 15 along the guide rails 16, and the contact 14 along the slide-wire 11. The galvanometer 24 has a pointer 29 carrying a contact 30, which may engage either of two stationary contacts 31 and 32 according to the sense of deflection of the galvanometer. Contacts 31 and 32 are connected to the windings 27 and 28 respectively of the motor 26 by means of conductors 33 and 34. The windings 27 and 28 have a common point 35 which, by means of a conductor 36, is connected to one side of an electrical power supply 37, and the other side of said supply is connected by means of a conductor 38 to the movable contact 30 of the galvanometer.

Characteristics and polarities of the potentiometer and control circuits are so chosen that the mechanism continually tends to position the contact 14 along the slide-wire 11 in a sense to reduce to zero the total value of E. M. F. existing in the circuit which includes the thermocouple and the galvanometer. An index 39 mounted on the carriage 15 cooperating with a stationary graduated scale 40 provides a measure of the position of the contact 14 with respect to the slide-wire, and therefore of the E. M. F., and thus of the temperature, of the thermocouple 21. For the instrument, as thus far described, no invention is claimed; and full equivalents therefor, and to which the invention may readily be adapted, are found in U. S. Letters-Patent No. 2,082,109, issued September 29, 1936, to O. H. Hunt, and in co-pending application Serial No. 363,275, filed October 29, 1940 by F. B. Bristol.

The pneumatic regulating mechanism by which the position of the valve 20 is controlled may advantageously be of the type set forth in U. S. Letters-Patent No. 1,880,247 to H. L. Griggs and A. R. Mabey, granted October 4, 1932, wherein a thin movable vane tends variably to obstruct the escape of air from a pair of opposed jets or orifices, thereby affecting the back pressure and controlling the action of a diaphragm valve. As herein set forth a thin metallic vane 41 is fixed to a rotatable shaft 42 and swings freely between opposed jets 43 of a divided orifice member 44. The orifice member 44 receives compressed air through a conduit 45, having therein a constriction 46, from a source of supply 47. A bellows member 48 communicating with the conduit 45 is adapted to respond through a limited range in its longitudinal dimension to variations in pressure within said conduit. A double-seated pilot valve 49 of the supply-and-waste type is provided with an internal cavity 50 containing a seating member 51 actuated from the bellows member 48 by means of a stem 52 whereby it may be made to engage alternatively either of two seat portions 53 and 54. A conduit 55 admits air from the supply 47 through the seat portion 53 to the cavity 50, and an annular space surrounding the stem 52 provides communication between the cavity 50 and the external atmosphere through the seat portion 54. The seating member 51, as it is moved alternatively into juxtaposition with the seat portions 53 and 54 affects the communication of the cavity 50 relatively with the atmosphere and the source of supply, thereby controllably varying the pressure in said cavity. A conduit 56 provides connection between the cavity 50 and the diaphragm top of the valve 20, thereby communicating to said valve the pressures developed in said cavity and rendering the valve controllable by the pilot valve 49, and thus subject to the position of the vane 41.

A differential gearing 57 includes two main bevel gears 58 and 59 and a planetary member 60 having pinions engaging both said gears, said planetary member being fixed to a rotatable shaft 61. Attached to the shaft 61 is also a cam member 62 having toward the extremities of its working face two arcuate portions 63 and 64, the radius of the former portion being materially greater than that of the latter, and a spiral portion 65 subtending an angle between said arcuate portions and forming a smooth transition between their respective radii. Fixed to the spindle 42 is a lever arm 66, carrying a roller 67 which engages the face of the cam 62, constituting a follower therefor, whereby the angular position of the spindle 42 and thus of vane 41 is made dependent upon that of the cam, and therefore of the planetary member 60.

Mounted integrally with the bevel gear 58 of the differential train 57, and free for rotation therewith about the shaft 61, is a spur gear 58'. An idler comprised of a pinion 68 and a gear 68' integrally mounted is free for rotation about a fixed spindle 10' on the frame 10, the pinion 68 meshing with the gear 58', and the gear 68' meshing with a pinion 69 carried by the shaft of the lead screw 17. Mounted integrally with the bevel gear 59 and free for rotation therewith about the shaft 61 is a spur gear 59' meshing with a pinion 70 fixed to a shaft 71 rotatably mounted in the framework 10 and positioned adjacent the scale 40 and parallel to the guide rails 16. Rotation of the shaft 71 is adjustably effected by means of a worm gearing 72 adapted for manual operation by means of a knurled knob 73. Fixed to the shaft 71 is a traversing screw 74 threadedly engaging a nut 75 free to travel on a guide rail 76 parallel to the guide rails 16. The nut 75 carries an index 77 which cooperates with the graduated scale 40 to provide an indication of the adjusted position of the shaft 71, and therefore of the gear 59 of the planetary train.

The ratios of the gears associated with the differential train and the relative pitches of the lead screw 17 and the traversing screw 74 are so selected that the magnitude of angular displacement imparted through the gear 58 to the planetary member 60, the shaft 61 and the cam member 62, by rotation of the lead screw 17 to move the index 39 a certain distance along the scale 40, will be exactly neutralized by the angular displacement imparted through the gear 59 and the pinion 70 from the traversing screw 74 by rotation of said screw through an angle sufficient to move the index 77 an equal distance along said scale.

The cam member is so proportioned that when in a position of balance, corresponding to identity of indication of the indices 39 and 77, the follower 67 will lie on the spiral portion 65 of its working face, whereby any departure of the indices 77 and 39 from identity of indication will cause the arm 66 to be angularly displaced, thereby effecting motion of the vane 41 with respect to the opposed jets of the orifice member 44.

The radii of the arcuate portions 63 and 64 of the cam face are such that when the follower 67 rests in engagement with either of these, the vane 41 will be positioned at the corresponding extreme of its working range, and of course will not change its position so long as the follower does not engage the spiral face. In order that the cam follower shall remain on the periphery of the cam whatever the relative position of the indices 39 and 77, the over-all circumferential length of the cam contour is made to correspond to slightly more than twice the whole range of travel of the carriage or the nut. By proportioning the angle subtended by the spiral portion 65 of the cam face to the whole angle of rotation of the cam, it is possible to select the "throttling range" of the control mechanism, or the portion of the whole working range within which the regulatory function will be effected.

The control function of the instrument as described being of the "throttling" type, it will be apparent that under different conditions demanding different rates of flow of fuel through the valve 20 this valve will require to be operated at different settings, and hence, the cam follower 67 will require to lie at different positions on the spiral part of the periphery of cam 63. Such being the case, it is obvious that identity of indication between the indices 77 and 39 can be obtained only with one certain position of the valve 20, and that for other positions of this valve there will be a difference in the indication of the two pointers, depending in its magnitude upon the width of the throttling range represented by the spiral part of cam 63.

For the purpose of explaining the complete operation of the instrument embodying the invention, it may be assumed that there has been attained a steady-state condition, in which admission of fuel to the burner 19 is just sufficient to maintain the oven 18 at a constant temperature. The potentiometer mechanism, subject to the galvanometer 24 and the motor 26, will have set the carriage 15 in a position where the E. M. F. derived from the slide-wire 11 by the contact 14 will serve to balance that developed in the thermocouple 21, reducing to a zero value the total E. M. F. in the thermocouple circuit. The position of the carriage will be indicated on the scale 40 by the index 39, thus providing a measure of the thermoelectromotive force developed by the couple, and therefore of the temperature within the oven 18. Under one such condition corresponding to a selected position of the valve 20 the index 39 will coincide with the index 77 in respect to the scale 40; and under this condition the vane 41 will occupy relatively to the jets of the orifice member what may be called an optimum position where the diaphragm valve 20 will be maintained at an opening sufficient to provide the required steady flow of fuel corresponding to the established temperature.

It may now be assumed that there has developed in the furnace a condition resulting in a lowering of temperature and requiring an increase in the rate of fuel supply. The lowering of temperature will lessen the thermoelectromotive force developed by the couple 21, disturbing the electrical equilibrium in the potentiometer system and causing a deflection of the contacting galvanometer 24, which, acting through the motor 26 and the lead screw 17 as hereinbefore set forth, will cause the contact 14 to approach a new balance position on the slide wire, the extent of movement being measured by the deflection of the index 39 and its departure from the indication of the index 77. The rotation of the lead screw 17 will be transmitted to the differential train; and, the angular displacement of the gear 58 not being neutralized by movement of the gear 59, the planetary member 60 and the cam member 62 will be angularly displaced, the movement of the spiral portion 65 with respect to the cam follower 67 serving to shift the lever arm 66 and the vane 41, thus changing the back pressure of air in the conduit 45. The changed air pressure in the conduit 45 will be communicated to the bellows 48, changing the setting of the three-way valve 49 and changing the pressure on the diaphragm valve 20, whereby the latter will tend to assume a new setting adapted to the admission of the required increase of rate of fuel supply to the burner 19. As hereinbefore pointed out, the changed demand for fuel may result in the finally attained temperature differing somewhat from the setting of the index 77; and where this deviation is of a magnitude greater than that permitted by the required precision of control, there may be applied one of several forms of "resetting" devices which, by coacting with the vane 41, will compensate for the deviations and maintaining a "straight line" control. Examples of such devices are set forth in the co-pending application Serial No. 174,609, filed by C. W. Bristol, November 15, 1937.

Should the demand for fuel be reduced, as indicated by an increase in oven temperature, the reaction will be carried, in a manner similar to that hereinbefore set forth, back through the potentiometer system, the differential gear train, the cam member and the pneumatic control to the fuel valve, establishing the fuel supply at the required lower value.

The preceding explanation applies to conditions where it is required that the temperature be maintained at a predetermined constant value. Where it is required that this value, (commonly known as the "control setting") be changed, the shaft 71 is rotated by manual operation of the worm gearing 72 by means of the knob 73, thus, through the pinion 70 and the gear 59, positioning the planetary member 60 and the cam member 62 in a position to move the vane 41 from its normal control position, the positions of elements corresponding to the changed condition being indicated by the index 77 on the scale 40. The disturbance of equilibrium in the pneumatic system occasioned by the change in position of the vane 41 will, according to actions hereinbefore set forth, act through the pilot valve 49 and the control valve 20 to change the rate of admission of fuel to the burner 19, with a consequent change in temperature in the oven 18. The changed temperature, influencing the thermocouple 21 and the associated potentiometer and electrical control circuits, will cause the motor 26 to rotate the shaft of the lead screw 17 to an extent that the differential gearing, actuated through the idler 68 and the gear 58, will tend to reset the cam member 62 to an angular position corresponding to the setting of the vane 41 at which there will be admitted to the furnace sufficient heating agent to maintain the newly established condition. As equilibrium is approached at the new setting, the temperature attained will be indicated by the position of the index 39 with respect to the scale 40. As hereinbefore pointed out, the action in the controller may be such as to attain a condition of balance with a slight deviation from the established setting of the index 77; but by proper selection of the throttling range or by the use of a suitable "resetting" device, this deviation may be reduced to a negligible magnitude or entirely eliminated. Such devices do not form a part of the present invention.

It may be noted that the arm 66 (Figs. 2 and 4) is constrained by its weight (or by a suitable spring) to maintain the roller 67 against the periphery of cam 62. The reaction between the roller 67 of arm 66, and the cam surface with which it engages, develops such torque of the cam about its axis of rotation as to eliminate backlash in the associated gearing.

A record of temperatures measured by the thermocouple 21 over a period of time may be obtained by means of a feed-roll 78 mounted in the frame and rotated about an axis parallel to the path of said carriage at a constant speed, as by a clock, and bearing a continuous sheet of chart paper 79 upon which a stylus or pen 80 provides a graph of all positions assumed by the carriage 15.

In the servicing of instruments involving measuring circuits and control apparatus of the classes set forth, it is highly important that it be possible to obtain access to all parts of the mechanism for observation and adjustment while the instrument is operating in a normal manner. The construction of an instrument involving all the elements hereinbefore set forth, in a form wherein all parts would be accessible from the front, would result in a unit occupying a prohibitive amount of panel space, and otherwise being of undesirable proportions. It becomes necessary, therefore, that the operating mechanism be of considerable depth, and that provision be made for removing it from its casing so that elements located toward the rearward parts of the assembly or on the ends would be readily accessible for examination and detailed servicing.

Various more or less effective expedients for this purpose have been developed, the most common being that of hinging the operating mechanism within its case to swing about a vertical axis. In instruments of this class wherein pneumatic control has been embodied, it has heretofore been the practice, partly because of the massive nature of the mechanism involved, and partly because of the difficulty in providing flexible connections to handle the relatively large volume of air required by the control systems employed, to affix the pilot valve or its equivalent to the interior of the case and provide a mechanical connection with the swingable part of the mechanism, whereby when the latter was swung out of the case, the pneumatic control system would be disconnected and thus rendered inoperative, having its function restored only when the mechanism is swung back into its normal operating position within the case. In the instrument embodying this invention, the relative lightness of the parts and the small amount of air flow required for operation of the pneumatic control system render it practicable to mount these parts integral with the frame of the instrument, providing connection thereto by means of flexible conduits, and enabling complete normal operation when the instrument is opened for inspection.

Referring to Fig. 1, the framework 10 which supports all the operative parts of the instrument as hereinbefore enumerated, is itself carried by a pair of hinges 81 and 82 disposed about a common vertical axis and mounted within and at one end of a casing 83 adapted to contain said framework and all parts carried thereby. The casing 83 may be supported in any conventional manner, as by resting upon a flat horizontal surface or by being suspended by lugs 84 from a suitable vertical surface or panel. Included in the conduits 45 and 56 are flexible sections 85 and 86 which may be fabricated from any suitable metallic or non-metallic tubing material. It is understood, moreover, that the electrical conductors, including the wires 36 and 38 communicating with the source of power for operating the potentiometer balancing mechanism, and the thermocouple leads 22 and 23, may also include flexible portions to permit of unhampered movement of the mechanism about the hinges 81 and 82.

When operating normally, the mechanism of the instrument, carried by the framework 10, is wholly within the case, the frame being secured in position by suitable fastening means, as a screw 87 threadedly engaging a lug 88 within the case. When it is desired to open the instrument for inspection, the screw 87 is released and the whole mechanism swung outward about the axis of the hinges 81 and 82 until all parts are accessible; and as the flexible connections provided maintain the pneumatic and electrical circuits, uninterrupted operation of all parts may continue to be effected in a normal manner.

In Fig. 5 is shown a modification of the invention, whereby its principles may be adapted to the purposes of electrical control. The arm 66 carries, instead of a vane, a rheostat-arm 89 adapted to cooperate with a resistor element 90 connected in circuit between a heating element 91 and a source of electrical energy 92. The thermocouple 21 being placed in a space to be heated by the element 91, control will be effected through the instrumentalities as hereinbefore described; the rheostat arm 89, by its position with respect to the resistance 90, serving to control the magnitude of current flowing in the element 91, and thus to regulate the temperature to which the thermocouple 21 is exposed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an instrument for measuring and controlling the magnitude of a variable condition, means sensitive to changes in said magnitude, a first deflecting member adapted by its deflection to provide a measure of said magnitude, a first rotatable element controlled by said sensitive means for positioning said member along a given path, a second deflecting member positionable along a path parallel to the first-mentioned path to positions corresponding to desired magnitudes of said condition, a second rotatable element operable concurrently with the positioning of said second deflecting member, a differential gearing comprising two main gears and a planetary member adapted to partake of the resultant motion of said main gears, one of said main gears being connected to the first rotatable element for rotation thereby, and the other of said main gears being connected to the second rotatable element for rotation thereby, and means controlled by said planetary member for regulating said variable condition.

2. In an instrument for measuring and controlling the magnitude of a variable condition, means sensitive to changes in said magnitude, a first deflecting member adapted by its deflection to provide a measure of said magnitude, a first rotatable element controlled by said sensitive means for positioning said member along a straight path, a second deflecting member positionable along a path parallel to the first-mentioned path to positions corresponding to desired magnitudes of said condition, a second rotatable element operable concurrently with the positioning of said second deflecting member, a differential gearing comprising two main gears and a planetary member adapted to partake of the resultant motion of said main gears, one of said main gears being connected to the first rotatable element for rotation thereby, and the other of said main gears being connected to the second rotatable element for rotation thereby, and means controlled by said planetary member for regulating said variable condition.

3. In an instrument for measuring and controlling the magnitude of a variable condition, means sensitive to changes in said magnitude, a first deflecting member adapted by its deflection to provide a measure of said magnitude, a first rotatable element controlled by said sensitive means for positioning said member along a given path, a second deflecting member positionable along a path parallel to the first-mentioned path to positions corresponding to desired magnitudes of said condition, a second rotatable element operable concurrently with the positioning of said second deflecting member, a differential gearing comprising two main gears and a planetary member adapted to partake of the resultant motion of said main gears, one of said mean gears being connected to the first rotatable element for rotation thereby, and the other of said main gears being connected to the second rotatable element for rotation thereby, cam means operated by said planetary member, and means cooperating with said cam means for controlling said variable condition.

4. In an instrument for measuring and controlling the magnitude of a variable condition, means sensitive to changes in said magnitude, a first deflecting member comprising a threaded nut displaceable to positions corresponding to changes in said magnitude, a first-rotatable element comprising a screw shaft controlled by said sensitive means and engaging said nut to position the latter axially along said shaft, a second deflecting member comprising a threaded nut, a second rotatable element comprising a screw shaft engaging the second-mentioned nut and manually operable to shift the same axially to positions corresponding to desired magnitudes of said condition, a differential gearing comprising two main gears and a planetary member adapted to partake of the resultant motion of said main gears, one of said main gears being connected to the first rotatable element for rotation thereby, and the other of said main gears being connected to the second rotatable element for rotation thereby, and means controlled by said planetary member for regulating said variable condition.

5. In an instrument for measuring and controlling the magnitude of a variable condition, means sensitive to changes in said magnitude, a first deflecting member comprising a threaded nut displaceable to positions corresponding to changes in said magnitude, a first-rotatable element comprising a screw shaft controlled by said sensitive means and engaging said nut to position the latter axially along said shaft, a second deflecting member comprising a threaded nut, a second rotatable element comprising a screw shaft engaging the second-mentioned nut and manually operable to shift the same axially to positions corresponding to desired magnitudes of said condition, a differential gearing comprising two main gears and a planetary member adapted to partake of the resultant motion of said main gears, one of said main gears being connected to the first rotatable element for rotation thereby, and the other of said main gears being connected to the second rotatable element for rotation thereby, cam means operated by said planetary member, means cooperating with said cam means for controlling said variable condition, said screw shafts being substantially parallel to each other, a scale extending substantially parallel to said screw shafts, and indicating elements positioned by the respective nuts for cooperation with said scale, the deviation between the positions of said indicating elements on said scale corresponding to the position of said cam means.

6. In an instrument for measuring and controlling the magnitude of a variable condition, means sensitive to changes in said magnitude, a graduated surface, a first deflecting member juxtaposed to said surface and adapted to provide thereon a measure of said magnitude, a first rotatable element controlled by said sensitve means for positioning said member with respect to the graduations on said surface, a second deflecting member juxtaposed to said surface and adapted to provide in conjunction with the graduations thereon measures corresponding to desired magnitudes of said condition, a second rotatable element operable concurrently with the positioning of said second deflecting member, a differential gearing comprising two main gears and a planetary member adapted to partake of the resultant motion of said main gears, one of said main gears being connected to the first rotatable element for rotation thereby, and the other of said main gears being connected to the second rotatable element for rotation thereby, cam means operated by said planetary member, and means cooperating with said cam means for controlling said variable condition.

ARTHUR R. MABEY.